United States Patent [19]

Plovnick

[11] Patent Number: 5,665,279
[45] Date of Patent: Sep. 9, 1997

[54] LOW DENSITY SILICON NITRIDE-CONTAINING BEADS, AGGREGATES THEREOF, AND METHOD FOR PREPARING SAME

[75] Inventor: Ross H. Plovnick, St. Louis Park, Minn.

[73] Assignee: Minnesota Mining & Manufacturing Company, St. Paul, Minn.

[21] Appl. No.: 743,527

[22] Filed: Nov. 4, 1996

Related U.S. Application Data

[62] Division of Ser. No. 300,143, Sep. 2, 1994, abandoned.

[51] Int. Cl.$^6$ ............................................. B29B 9/00
[52] U.S. Cl. ............................. 264/6; 264/5; 264/13
[58] Field of Search ........................ 264/5, 6, 13, 14

[56] References Cited

U.S. PATENT DOCUMENTS

| | | | |
|---|---|---|---|
| 3,345,235 | 10/1967 | Miller | 264/6 |
| 4,517,168 | 5/1985 | Kawahito et al. | 423/344 |
| 4,614,630 | 9/1986 | Pluim, Jr. | 264/219 |
| 4,629,707 | 12/1986 | Wolfe | 501/97 |
| 4,704,079 | 11/1987 | Pluim, Jr. | 425/190 |
| 4,707,459 | 11/1987 | Kennedy et al. | 501/90 |
| 5,114,693 | 5/1992 | Hintermayer et al. | 423/344 |
| 5,126,295 | 6/1992 | Uchino et al. | 501/97 |
| 5,312,571 | 5/1994 | Pujari et al. | 264/13 |
| 5,401,450 | 3/1995 | Mitomo et al. | 264/65 |
| 5,405,592 | 4/1995 | Edler et al. | 423/344 |
| 5,466,400 | 11/1995 | Pujari et al. | 264/13 |
| 5,472,919 | 12/1995 | Mitomo et al. | 501/97 |

FOREIGN PATENT DOCUMENTS

| | | |
|---|---|---|
| 1290739 | 10/1991 | Canada . |
| 2-180709 | 12/1988 | Japan . |
| 4-200735 | 7/1992 | Japan . |

OTHER PUBLICATIONS

Ritzhaupt–Kleissl et al., *Chem Abstracts* No. 116:260829N, 1992.
Kawahara et al. *Chem Abstracts* No. 116:157262y, 1992.
*Chem Abstract* No. 110:81339g, Abstract for Japanese Patent Document No.63–222,805, Sep. 16, 1988.
*Chem Abstract* 105:99934d, Abstract for Japanese Patent Document No. 61–86,418, May 1, 1986.
*Chem Abstract* 105:99935e, Abstract for Japan Patent Document No. 61–86,419, May 1, 1986.

*Primary Examiner*—Mary Lynn Theisen
*Attorney, Agent, or Firm*—Gary L. Griswold; Walter N. Kirn, Jr.; Gregory D. Allen

[57] ABSTRACT

A sintered bead that includes at least 95% by weight silicon nitride, based on the total weight of the bead, and has a bulk density no greater than about 60% of theoretical density. The invention further features aggregates prepared from a plurality of such beads, as well as methods for preparing the beads and aggregates.

14 Claims, No Drawings

LOW DENSITY SILICON NITRIDE-CONTAINING BEADS, AGGREGATES THEREOF, AND METHOD FOR PREPARING SAME

This is a divisional of application Ser. No. 0/300,143, filed Sep. 2, 1994, now abandoned.

BACKGROUND OF THE INVENTION

1. Field of the Invention

This invention relates to silicon nitride-containing beads and aggregates thereof.

2. Description of the Related Art

High density silicon nitride ceramics (i.e., silicon nitride ceramics having a bulk density approaching or equal to theoretical density) having good oxidation resistance, mechanical properties, and thermal shock resistance are known. Such ceramics are used, for example, as cutting tools and as components for automotive engines and gas turbines. Densification techniques for providing the high density silicon nitride ceramics include pressureless sintering, gas pressure sintering, hot pressing, and hot isostatic pressing. Furthermore, sintering aids such as rare earth oxides, magnesia, and alumina are often used to assist densification.

SUMMARY OF THE INVENTION

The invention provides a sintered bead that includes at least 95% by weight silicon nitride (based on the total weight of the bead) and has a bulk density no greater than about 60% of theoretical density, as well as a plurality of such beads that are free flowing. Preferably, the bulk density ranges from 40 to 55% of theoretical density.

The average diameter of the bead preferably is at least 0.5 mm, and may range, e.g., from 0.5 to 5 mm. The bead preferably is predominantly beta-silicon nitride. Moreover, the bead is preferably spheroidal in shape.

In another aspect, the present invention provides an aggregate that includes a plurality of beads according to the present invention bonded to each other.

In yet another aspect, the present invention provides a method for preparing beads according to the present invention, the method comprising the steps of:

(a) providing a sufficient amount of a mixture comprising (i) an aqueous solution of a water-soluble organic polymer; and (ii) a powder comprising silicon, silicon nitride, or a combination thereof to provide after steps (b), (c), and (d) a plurality of free flowing, sintered silicon nitride beads each having at least 95% by weight silicon nitride (based upon the total weight of the bead) and a bulk density no greater than about 60% of theoretical density;

(b) injecting the mixture into an aqueous coagulating solution to form a plurality of beads;

(c) removing volatiles from the beads; and (d) sintering the beads of step (c) in the presence of nitrogen to form free flowing, sintered silicon nitride beads which are at least 95 percent by weight silicon nitride (based on the total weight of the bead) and have a bulk density no greater than about 60 percent of theoretical density.

In yet another aspect, the present invention features a method for preparing aggregates according to the present invention, the method comprising the steps of:

(a) providing a mixture comprising a sufficient amount of (i) an aqueous solution of a water-soluble organic polymer and (ii) a powder comprising silicon, silicon nitride, or a combination thereof to provide after steps (b), (c), (d), and (e) an aggregate comprising a plurality of sintered silicon nitride beads bonded together, each of the beads having at least 95% by weight silicon nitride (based upon the total weight of the bead) and a bulk density no greater than about 60% of theoretical density;

(b) injecting the mixture into an aqueous coagulating solution to form a plurality of beads;

(c) contacting the beads with an aqueous solution comprising a fugitive bonding agent to form a precursor aggregate in which the beads are held together;

(d) removing volatiles from the precursor aggregate; and (e) sintering the precursor aggregate of step (d) in the presence of nitrogen to form an aggregate that includes a plurality of beads according to the present invention bonded to one another.

The water soluble organic polymer preferably is a salt of alginic acid, e.g. a sodium salt ("sodium alginate"). The coagulating solution preferably contains calcium chloride.

In this application:

"free flowing" means that the beads are discrete and do not stick to each other;

"silicon nitride" refers to one or more crystalline types of silicon nitride, including alpha-silicon nitride and beta-silicon nitride;

"predominantly beta-silicon nitride" means that the ratio of beta to alpha-silicon nitride is at least 2:1, as measured by x-ray diffraction;

"predominantly alpha-silicon nitride" means that the ratio of alpha to beta-silicon nitride is at least 2:1, as measured by x-ray diffraction;

"sintered" refers to densification or consolidation of powder during exposure to elevated temperatures (e.g., 1000° C. or greater);

"bulk density" refers to density as measured by the Archimedes method (described infra);

"aggregate" refers to a sintered collection of individual silicon nitride-containing beads in which the individual beads are weakly bonded to each other to form a monolithic structure from which individual beads can be broken off and separated by hand;

"precursor aggregate" refers to an unsintered collection of individual beads in which the individual beads are held together by means of a fugitive bonding agent to form a monolithic structure from which individual beads can be broken off and separated by hand;

"fugitive bonding agent" refers to a material that bonds the silicon nitride-containing beads together prior to sintering to form a precursor aggregate containing such beads, but is substantially gone following sintering such that the individual beads are bonded to each other to form the aggregate.

The present invention provides low density sintered silicon nitride-containing beads and aggregates based upon such beads useful in a variety of applications, including thermal insulation for, e.g., conventional or microwave furnaces; high temperature support materials for catalysts; refractory filler; abrasive grain; and milling media. The aggregates may also be infiltrated with metals to form composite materials.

DESCRIPTION OF THE PREFERRED EMBODIMENTS

Free flowing, sintered, low density silicon nitride-containing beads according to the invention have a bulk density (as measured by the Archimedes method, infra) of no greater than about 60% of theoretical density (i.e., 3.2 g/cm$^3$ based upon x-ray diffraction data for both alpha and beta-silicon nitride (ICCD Powder Diffraction File, 1990, cards No. 9-250 (alpha) and 33-1160 (beta))). The beads have shapes ranging from ovoids to spheres, with spheres being preferred.

The beads are prepared using either silicon powder, silicon nitride powder, or a combination thereof as the starting material. The powder preferably has an average particle size ranging from about 0.5 micrometer to about 10.0 micrometers. An example of a suitable silicon powder is commercially available from Cerac Corp. of Milwaukee, Wis. under the product number "S-1053." This powder has an average particle size of about 10.0 micrometers and is 99.5% pure.

The silicon nitride powder may be predominantly alpha-silicon nitride, predominantly beta-silicon nitride, or a mixture thereof. An example of a suitable predominantly alpha-silicon nitride powder is commercially available from H. C. Starck, Inc. of New York, N.Y. under the product number "LC12N." This powder has an average particle size of less than 0.5 micrometer. An example of a suitable predominantly beta-silicon nitride powder is commercially available from Cerac Corp. under the product number "S-1177." This powder has an average particle size of about 2.0 micrometers and is 99.5% pure.

The silicon or silicon nitride powder, or combination thereof, is first combined with an aqueous solution of a water-soluble organic polymer to form a viscous, honey-like mixture and stirred to ensure complete mixing. The water-soluble organic polymer should be one which can subsequently be rapidly insolubilized in a suitable coagulating solution. Examples of suitable organic polymers include salts of alginic acid (e.g., sodium or ammonium salts) and poly(vinyl alcohol), with sodium and ammonium alginic acid salts being preferred. A wetting agent (e.g., an ammonium polycarboxylate dispersant commercially available under the trade designation "DAXAD" from W. R. Grace & Co. of Owensboro, Ky.) may also be added to aid in dispersing the powder. It is generally preferred to add the powder to a pre-blended mixture of water, organic polymer, and wetting agent in order to achieve rapid mixing.

Beads are formed by dispensing the viscous mixture from a small diameter opening (e.g., about 2–4 mm in diameter) into a stirred aqueous coagulating solution to insolubilize the water soluble polymer. Resilient, rubbery beads form upon contact with the coagulating solution. The coagulating solution preferably contains a salt (e.g., a calcium salt such as calcium chloride, an aluminum salt such as $Al_2(SO_4)_3$, a zirconium salt such as $Zr(SO_4)_2$, or an yttrium salt such as $YCl_3$). The function of the salt is to react with and rapidly insolubilize the water-soluble polymer. The combination of an alginate salt (as the water soluble polymer) and a calcium chloride coagulating solution is preferred because it tends to produce the greatest number of spheroidally shaped beads.

After the beads are formed, they are collected (e.g., by suction filtration using a water aspirator) and washed several times with distilled deionized (DDI) water to remove water soluble material. The beads. generally range in size from 0.5 to 5 mm. Water is then removed from the beads, e.g., by drying them in a microwave or conventional oven, after which they are calcined in the presence of air in a furnace to remove all volatile constituents. Typical calcining temperatures range from about 400° C. to 600° C.

Following calcining, the beads are sintered. In the case of beads prepared from silicon powder, the beads are reaction-sintered in a furnace under a nitrogen atmosphere according to conventional techniques, with the heating cycle selected to control the nitridation rate. In the case of beads containing silicon nitride powder, the beads are sintered in a furnace under a nitrogen atmosphere according to conventional techniques. In either case, the sintered beads are grey and free flowing. The beads generally range in size from 0.5 to 5 mm.

Aggregates based upon the silicon nitride-containing beads are prepared by taking the wet beads (i.e., the beads prior to water removal and calcination) and introducing them into an aqueous solution of a fugitive bonding agent to join the beads together in the form of a weakly bonded precursor aggregate. A preferred fugitive bonding agent is a chelating agent such as a salt of ethylene diamine tetraacetic acid ("EDTA"). EDTA salts are particularly preferred when used in combination with calcium salt-containing coagulating solutions due, it is believed, to ready ion exchange between the calcium ions and the EDTA counterions.

Although not wanting to be bound by theory, it is believed that the EDTA causes the surfaces of the wet beads to become tacky. The tack is sufficient to cause the beads to stick together and form a precursor aggregate that conforms to the shape of the container in which the beads are placed. After drying, the precursor aggregate pulls away from the sides of the container and is readily removed. The beads in the dried precursor aggregate are not strongly bonded to each other (i.e., they can be separated by hand). After removing water, the precursor aggregate is calcined and sintered as described above in the case of individual silicon nitride-containing beads to form the final aggregate.

Beads and aggregates according to the present invention are useful in a variety of applications, including thermal insulation for, e.g., conventional or microwave furnaces; high temperature support materials for catalysts; refractory filler; abrasive grain; and milling media. The aggregates may also be infiltrated with metals to form composite materials.

Objects and advantages of this invention are further illustrated by the following examples, but the particular materials and amounts thereof recited in these examples, as well as other conditions and details, should not be construed to limit this invention. All parts and percentages are by weight unless otherwise indicated.

EXAMPLES

Elemental Analysis

For each of the examples, Induction Coupled Plasma (ICP) spectroscopic survey elemental analysis was carried out for both the Si and $Si_3N_4$ starting materials and the sintered $Si_3N_4$ beads. In the case of both the starting materials and the sintered beads, the analysis indicated that less than 0.1% of some elements was typically present (e.g., Cr, Cu, Mg, Mn, Mo, Na, Ni, and Ti) and that less than 0.5% of other elements was typically present (e.g., Al and Ca).

Bulk Density of the Beads

The Archimedes technique was used to measure the bulk density of sintered beads and to determine their volume percent porosity. Approximately 30 to 50 beads were weighed together in air in a small flask. Odorless mineral spirits were added to the beads in the flask and placed into a vacuum desiccator. A partial vacuum was established in order to remove air from the beads and fill pores in the beads with the odorless mineral spirits. The beads remained in the desiccator for about 30 minutes, at which time no more air bubbles were observed. The beads were weighed again while suspended in the odorless mineral spirits. The density of the liquid medium was determined by weighing a fully dense alumina ball of known volume suspended therein. The percentage of theoretical density of the sintered beads was calculated based on a density of 3.2 g/cm$^3$ for fully dense $Si_3N_4$.

Compressive Strength of the Beads

The compressive force to break point of ten representative beads was measured one bead at a time using a universal testing machine (Model 1101 commercially available from Applied Test Systems, Inc. of Butler, Pa.). Each bead was placed on the lower platen (of two parallel plates) and allowed to come to rest. The hardened steel platens were moved toward one another, compressing the bead until it broke. Crosshead rate of travel was 0.50 mm/min.

Example 1

This example illustrates the preparation of low density silicon nitride-containing beads from silicon powder and sodium alginate.

The following ingredients were weighed into a 500 mL plastic bottle: 150 grams silicon powder (average particle size 10.0 micrometers, 99.5% pure, commercially available under the product number "S-1053" from Cerac Corp. of Milwaukee, Wis.), 7.8 grams sodium salt of alginic acid (commercially available under the product number "AX0450-1" from EM Science of Gibbstown, N.J.), and 397.5 grams of distilled, deionized (DDI) water. An air driven mixer (commercially available under the trade designation "Jiffy" mixer, model LM, from Jiffy Mixer Co., inc., of Riverside, Calif.) was used to stir the mixture for 165 minutes.

After stirring, the smooth, honey-like mixture was dispensed dropwise from a 4 mm opening into a magnetically stirred solution containing 15 grams of $CaCl_2 \cdot 2H_2O$ (commercially available from MC&B Chemicals of Norwood, Ohio) in 485 grams of DDI water to form rubbery, substantially spherical beads. The beads were recovered by suction filtration and washed 10 times on a Buchner filter funnel with DDI water. The beads were then poured into a crystallizing dish and heated at full power in a conventional 700 watt microwave oven for 19 minutes. The resulting dried beads were sieved to remove small particles, yielding 145.7 grams of beads having diameters greater than 1.7 mm.

Next, the sieved beads were transferred to alumina combustion trays and heated in air to 500° C. at a rate of 1° C./minute followed by 3 hours at 500° C. to burn off residual alginate. The resulting beads were free-flowing. The foregoing preparative method was repeated twice more, yielding a combined total of 429 g of beads, which were then placed in boron nitride-coated carbon trays and sintered in a nitrogen atmosphere at a flow rate of 750 cm$^3$/min. according to the following temperature profile ("RT" designates room temperature):

RT→1000° C. in 1 hour
1000° C.→1150° C. @ 3° C./min
1150° C.→1350° C. @ 1° C./min
1350° C. hold 3 hours
1350° C.→1400° C. @ 0.5° C./min
1400° C. hold 1 hour
1400° C.→RT in 4 hours.

The sintered beads were free flowing. The yield was 580 grams, which occupied a volume of about 675 cm$^3$. X-ray diffraction analysis indicated that a substantial percentage had not converted to silicon nitride, so the sintering step was repeated. In the second sintering step, the beads were heated from 1000° C. to 1450° C. at 45° C./min and held for 8 hours at 1450° C. The resulting 668 grams of beads remained free flowing. X-ray diffraction analysis revealed the following phases and relative intensities: [Beta-$Si_3N_4$][100], [alpha-$Si_3N_4$][45], and [Si][6]. This indicates that the beads were almost completely nitrided (96% silicon nitride) and that little residual silicon remained.

Measurement of 45 representative beads indicated their bulk density to be 1.596 g/cm$^3$, which represents 50.1% of the theoretical density of silicon nitride. The volume porosity of the beads was determined to be 49.4%. The compressive strength of the beads was found to be 24±4 kg.

Example 2

This example illustrates the preparation of low density silicon nitride-containing beads from predominantly alpha-silicon nitride powder and sodium alginate.

The following ingredients were weighed into a 1 gallon jar: 500 grams predominantly alpha-silicon nitride powder (commercially available under the product number "LC12N" from H. C. Starck, Inc. of New York, N.Y. having an average particle size of less than 0.5 micrometer), 26 grams sodium salt of alginic acid ("AX0450-1"), and 1325 grams DDI water. X-ray diffraction analysis of the as-received silicon nitride powder showed it contained only beta-silicon nitride and alpha-silicon nitride in the relative proportions 100 alpha to 9 beta.

An air driven mixer ("Jiffy Model HS-1") was used to stir the mixture for 4 hours. After stirring, the smooth, honey-like mixture was dispensed dropwise from a 4 mm opening into a magnetically stirred solution of 27 grams of $CaCl_2 \cdot 2H_2O$ in 873 grams of DDI water to form rubbery, substantially spherical beads. The beads were recovered by suction filtration and washed 10 times on a filter with DDI water. The beads were then poured into a crystallizing dish and heated at full power in a conventional 900 watt microwave oven for a total of 40 minutes; heating was stopped intermittently to decant water and/or to agitate the beads. The substantially dried beads were sieved to remove particles smaller than 1.7 mm in diameter.

Next, the sieved beads were heated in air at 500° C. for 3 hours, as described in Example 1. The resulting beads were free-flowing, grey-white, and typically 3–4 mm in diameter. The total yield of beads was 465 grams. These beads had good cohesive strength and could be poured and handled without breakage. The beads were then placed in boron nitride-coated carbon trays and sintered in a nitrogen atmosphere according to the following heating profile ("RT" designates room temperature):

RT→1000° C. in 30 minutes
1000° C.→1650° C. @ 10° C./min
1650° C. hold 1 hour
1650° C.→RT in 4 hours.

The sintered beads remained free-flowing, and were uniformly ivory-white in color. The yield of these sintered beads was 446 grams. X-ray diffraction analysis indicated that the beads contained only beta-$Si_3N_4$ and alpha-$Si_3N_4$, in the relative proportions 100 beta to 56 alpha.

Measurement of 40 representative beads indicated their bulk density to be 1.694 g/cm$^3$, which represented 53.1% of the theoretical density of silicon nitride. The volume porosity of the beads was determined to be 43.2%. The compressive strength of the beads was found to be 31±5 kg.

Example 3

This example illustrates the preparation of low density silicon nitride-containing beads from predominantly beta-silicon nitride powder and sodium alginate.

Silicon nitride-containing beads were prepared according to the procedure of Example 2 except that predominantly beta-silicon nitride powder (commercially available under the product number "S-1177" from Cerac Corp. of Milwaukee, Wis. having an average particle size of 2 micrometers) was used, and in the heating schedule the beads were heated from room temperature to 1000° C. in 1 hour. X-ray diffraction analysis of the as-received silicon nitride powder showed it consisted of beta-silicon nitride and alpha-silicon nitride in the relative proportions 100 beta to 10 alpha, plus a minor amount of free silicon. X-ray diffraction analysis of the sintered beads showed they contained only beta-silicon nitride and alpha-silicon nitride in the relative proportions 100 beta to 2 alpha.

Measurement of 30 representative beads indicated their bulk density to be 1.462 g/cm3, which represents 45.8% of the theoretical density of silicon nitride. The volume porosity of the beads was determined to be 55.3%. The compressive strength of 10 representative beads was found to be 6±2 kg.

Example 4 and Comparative Example A

This example illustrates the preparation of a silicon nitride-containing aggregate formed from silicon nitride-containing beads.

An air driven mixer ("Jiffy Model LM") was used to blend, in a 500 mL plastic bottle, 5 grams ammonium alginate (commercially available from WAKO Chemicals U.S.A., Inc., Richmond, Va.), 200 grams DDI water, and 0.5 grams ammonium polycarboxylate dispersant (commercially available under the trade designation "DAXAD", from W. R. Grace & Co. of Owensboro, Ky.). After 1 hour, the stirring was stopped and 100 grams of predominantly alpha-silicon nitride powder (commercially available under the product number "LC12N" from H. C. Starck, Inc. of New York, N.Y., as a powder having an average particle size of less than 0.5 micrometer) was added.

Following silicon nitride addition, stirring was continued for another 4 hours. The mixture was then dispensed through a 4 mm orifice into stirred solution containing 15 grams reagent grade $CaCl_2 \cdot 2H_2O$ in 485 grams DDI water to form spheroidal beads. The beads were washed 10 times with DDI water on a suction filter funnel and then used to make aggregates as follows.

A quantity of the wet beads was treated with 0.4M $(NH_4)_2EDTA$ solution (prepared from 15 grams $(NH_4)_2EDTA$ (commercially available as product number 03639 from Fluka BioChemika of Ronkonkoma, N.Y.) and 120 grams DDI water) by slowly aspirating the solution through the beads in a filter funnel fitted with Whatman #50 filter paper. The beads were tacky to the touch and stuck together.

The treated beads were poured into a crystallizing dish (60 mm diameter×15 mm high).and heated at full power in a conventional 700 watt microwave oven for 3 minutes to quickly dry them. Drying yielded a fully bonded precursor aggregate measuring 50 mm in diameter ×10 mm high. This precursor aggregate weighed 15.66 grams. Within the precursor aggregate the individual beads were bonded strongly enough together to enable the precursor aggregate to be handled. Individual beads, however, could be broken off by hand from the precursor aggregate.

Comparative A was prepared according to the procedure of Example 4, except that the wet silicon nitride beads were dried by heating at full power in a conventional 700 watt microwave oven for 3 minutes prior to treatment with $(NH_4)_2EDTA$ solution. Treatment of the dried beads with $(NH_4)_2EDTA$ solution failed to yield bonded aggregates, indicating that it is preferable to treat wet beads with the EDTA solution in order to make the surface of the beads tacky.

Example 5

This example illustrates the preparation of silicon nitride aggregates containing low density, sintered, silicon nitride beads.

Four silicon nitride precursor aggregates were prepared as described in Example 4. These precursor aggregates were calcined at 500° C. for 3 hours in air to burn off volatile constituents, then placed into a furnace under nitrogen atmosphere and sintered at 1650° C. for 1 hour to yield the sintered aggregate. Each sintered aggregate retained its pre-sintered dimension. The aggregates also exhibited good qualitative strength, i.e., they did not break when dropped onto a wood surface from a height of 10 cm.

Various modifications and alterations of this invention will become apparent to those skilled in the art without departing from the scope and spirit of this invention, and it should be understood that this invention is not to be limited to the illustrative embodiments set forth herein.

What is claimed is:

1. A method for preparing beads comprising silicon nitride comprising the steps of:
   (a) providing a sufficient amount of a mixture comprising (i) an aqueous solution of a water-soluble organic polymer and (ii) a powder comprising silicon, silicon nitride, or a combination thereof, to provide after steps (b), (c), and (d) a plurality of free flowing, sintered silicon nitride beads in which each of the beads comprises at least 95% by weight silicon nitride, based on the total weight of the bead, and in which each of the beads has a bulk density no greater than about 60% of theoretical density;
   (b) injecting said mixture into an aqueous coagulating solution to form a plurality of beads;
   (c) removing volatiles from said beads; and
   (d) sintering said beads of step (c) in the presence of nitrogen to form a plurality of free flowing, sintered silicon nitride beads in which each of said beads comprises at least 95% by weight silicon nitride, based on the total weight of the bead, and in which each of said beads has a bulk density no greater than about 60% of theoretical density.

2. A method according to claim 1 in which said water soluble organic polymer comprises a salt of alginic acid.

3. A method according to claim 2 comprising the sodium salt of alginic acid.

4. A method according to claim 1 in which said coagulating solution comprises calcium chloride.

5. A method according to claim 1 in which said powder is silicon powder.

6. A method according to claim 1 in which said powder is silicon nitride powder.

7. A method for preparing an aggregate comprising the steps of:
   (a) providing a mixture comprising a sufficient amount of (i) an aqueous solution of a water-soluble organic polymer and (ii) a powder comprising silicon, silicon nitride, or a combination thereof, to provide after steps (b), (c), (d), and (e) an aggregate comprising a plurality of sintered silicon nitride beads bonded together in which each of the beads comprises at least 95% by weight silicon nitride, based on the total weight of the bead, and each of the beads has a bulk density no greater than about 60% of theoretical density;

(b) injecting said mixture into an aqueous coagulating solution to form a plurality of beads;

(c) contacting said beads with an aqueous solution comprising a fugitive bonding agent to form a precursor aggregate in which said beads of step (b) are held together;

(d) removing volatiles from said precursor aggregate; and (e) sintering the precursor aggregate of step (d) in the presence of nitrogen to form said aggregate comprising a plurality of sintered silicon nitride beads bonded together in which each of said beads comprises at least 95% by weight silicon nitride, based on the total weight of said bead, and each of said beads has a bulk density no greater than about 60% of theoretical density.

8. A method according to claim 7 in which said fugitive bonding agent comprises a chelating agent.

9. A method according to claim 8 in which said chelating agent comprises a salt of ethylene diamine tetraacetic acid.

10. A method according to claim 7 in which said water soluble organic polymer comprises a salt of alginic acid.

11. A method according to claim 10 comprising the sodium salt of alginic acid.

12. A method according to claim 7 in which said coagulating solution comprises calcium chloride.

13. A method according to claim 7 in which said powder is silicon powder.

14. A method according to claim 7 in which said powder is silicon nitride powder.

* * * * *